(12) United States Patent
Ando et al.

(10) Patent No.: US 11,709,229 B2
(45) Date of Patent: Jul. 25, 2023

(54) LASER RADAR DEVICE

(71) Applicant: Mitsubishi Electric Corporation, Tokyo (JP)

(72) Inventors: Toshiyuki Ando, Tokyo (JP); Eisuke Haraguchi, Tokyo (JP); Hitomi Ono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 994 days.

(21) Appl. No.: 16/343,584

(22) PCT Filed: Dec. 21, 2016

(86) PCT No.: PCT/JP2016/088135
§ 371 (c)(1),
(2) Date: Apr. 19, 2019

(87) PCT Pub. No.: WO2018/116412
PCT Pub. Date: Jun. 28, 2018

(65) Prior Publication Data
US 2020/0049799 A1 Feb. 13, 2020

(51) Int. Cl.
*G01S 17/26* (2020.01)
*G01S 7/481* (2006.01)

(52) U.S. Cl.
CPC .......... *G01S 7/4814* (2013.01); *G01S 7/4813* (2013.01); *G01S 17/26* (2020.01)

(58) Field of Classification Search
CPC ...... G01S 7/4814; G01S 7/4813; G01S 17/26; G01S 7/4818; G01S 7/484; G01S 7/486; G01S 17/58; G01S 17/95; Y02A 90/10
See application file for complete search history.

(56) References Cited

U.S. PATENT DOCUMENTS 9,310,487 B2    4/2016  Sakimura et al.
9,680,576 B1 *  6/2017  Middleton ............. H04B 10/00
(Continued)

FOREIGN PATENT DOCUMENTS

EP    3081956 A1    10/2016
JP    5-302976 A    11/1993
(Continued)

OTHER PUBLICATIONS

International Search Report for PCT/JP2016/088135 (PCT/ISA/210) dated Mar. 28, 2017.
(Continued)

*Primary Examiner* — David P Porta
*Assistant Examiner* — Mamadou Faye
(74) *Attorney, Agent, or Firm* — Birch, Stewart, Kolasch & Birch, LLP (57) ABSTRACT

A laser radar device includes: a modulator (8) for causing a transmission seed light beam to branch, and giving different offset frequencies to a plurality of the transmission seed light beams having branched, and then modulating the plurality of transmission seed light beams into pulsed light beams and outputting the pulsed light beams, or for modulating the transmission seed light beam into a pulsed light beam, causing the pulsed light beam to branch, and giving the different offset frequencies to a plurality of the pulsed light beams having branched, and then outputting the plurality of pulsed light beams; a band pass filter (14) in which a frequency band including frequencies of signal components included in a plurality of beat signals detected by an optical heterodyne receiver (13) is set as a pass band and a frequency band not including the frequencies of the signal components is set as a cutoff band; and an ADC (15) for sampling the beat signals passing through the band pass filter (14) at a sampling frequency.

7 Claims, 7 Drawing Sheets

(56) References Cited

U.S. PATENT DOCUMENTS

| | | | | |
|---|---|---|---|---|
| 2007/0052581 A1* | 3/2007 | Shima | ............... | G01S 7/4021 |
| | | | | 342/174 |
| 2012/0293358 A1 | 11/2012 | Itoh | | |
| 2014/0233013 A1* | 8/2014 | Sakimura | ............ | G01S 7/4815 |
| | | | | 356/5.01 |
| 2016/0291135 A1* | 10/2016 | Ando | ............... | G01S 7/4811 |

FOREIGN PATENT DOCUMENTS

| | | |
|---|---|---|
| JP | 4127649 B2 | 7/2008 |
| JP | 2010-151806 A | 7/2010 |
| JP | 2013-197280 A | 9/2013 |
| JP | 5738436 B2 | 6/2015 |
| JP | 6005302 B2 | 10/2016 |
| WO | WO 2013/094431 A1 | 6/2013 |

OTHER PUBLICATIONS

Chinese Office Action dated Nov. 16, 2022 issued in corresponding Chinese Patent Application No. 201680091529.6 with an English Translation.

\* cited by examiner

FIG. 4A Spectra Of Beat Signals

FIG. 4B Pass Bands Of BPF 14

FIG. 4C Spectrum Of Beat Signal After Undersampling

FIG. 5A
Beat Signal Whose Spectrum Is $SP_{RX1}$

FIG. 5B
Beat Signal Whose Spectrum Is $SP_{RX2}$

FIG. 5C
Beat Signal Whose Spectrum Is $SP_{RX3}$

FIG. 5D
Beat Signal Whose Spectrum Is $SP_{AS}$ $1/f_{nyq}$

LASER RADAR DEVICE

TECHNICAL FIELD

The present disclosure is directed to laser radar devices for emitting pulsed light beams into space and receiving backscattered light beams of the emitted pulsed light beams.

BACKGROUND ART

In laser radar devices, stimulated Brillouin scattering may occur when a pulsed light beam having a certain intensity or more enters a transmission path.

The stimulated Brillouin scattering is a phenomenon that occurs when the incident pulsed light beam generates acoustic-wave phonons which, in turn, give rise to a periodic modulation of refractive index, along the transmission direction, in an optical fiber constituting the transmission path.

The stimulated Brillouin scattering is a phenomenon in which the modulation of refractive index behaves as if a diffraction grating is installed in the transmission path, and as a result, the incident pulsed light beam is scattered backward with respect to the propagation direction.

For example, in a case where a laser radar device includes an optical high power amplifier for amplifying a pulsed light beam, when optical power of the incident pulsed light beam or optical power of the pulsed light beam amplified by the optical high power amplifier exceeds an occurrence threshold of the stimulated Brillouin scattering, the optical power exceeding the occurrence threshold is scattered backward.

For this reason, output power of the laser radar device may be limited.

It is known that the gain bandwidth of the stimulated Brillouin scattering is about 10 to 100 MHz in a typical single mode optical fiber.

For this reason, in a case where N pulsed light beams having the frequency difference larger than 100 MHz are simultaneously incident on the optical high power amplifier, the optical power of the pulsed light beam of each wavelength can be increased within a range not exceeding the occurrence threshold of the stimulated Brillouin scattering. As a result, in the case where the N pulsed light beams having the frequency difference larger than 100 MHz are simultaneously incident on the optical high power amplifier, the output power of the laser radar device can be increased to N times as compared with a case where one pulsed light beam is incident.

Patent Literature 1 below discloses a laser radar device in which N pulsed light beams having the frequency difference larger than 100 MHz are simultaneously incident on the optical high power amplifier.

CITATION LIST

Patent Literature

Patent Literature 1: WO 2013/094431 A

SUMMARY OF INVENTION

Technical Problem

Since the conventional laser radar device is configured as described above, it is possible to avoid influence of the stimulated Brillouin scattering, but there has been a problem in that the SNR, a ratio of a signal component to a noise component, decreases.

More detailed description of this is as follows.

To avoid saturation of an optical heterodyne receiver, the maximum power of the backscattered light beam incident on the optical heterodyne receiver is rated. To maximize the SNR, it is necessary to set the local oscillation light beam used when the optical heterodyne receiver carries out optical heterodyne detection to a value close to the rated maximum power. In a case where pulsed light beams of a plurality of wavelengths are used to avoid the influence of the stimulated Brillouin scattering, it is necessary to avoid saturation when the optical heterodyne receiver carries out optical heterodyne detection of the backscattered light beams of the plurality of wavelengths. For this reason, it is necessary to set the optical power of the local oscillation light beam per wavelength to 1/(the number of wavelengths).

As a result, because the optical power of the local oscillation light beam per wavelength decreases, there has been a problem in that the SNR per wavelength decreases.

Embodiments of the present disclosure have been made to solve the problems described above, and an object of the embodiments is to obtain a laser radar device capable of avoiding the influence of the stimulated Brillouin scattering and increasing the SNR.

Solution to Problem

A laser radar device according to the present disclosure includes: a modulator for causing a transmission seed light beam to branch, introducing differing offset frequencies to a plurality of branched transmission seed light beams, modulating each of the plurality of transmission seed light beams into a pulsed light beam, and outputting a plurality of pulsed light beams, or for modulating a transmission seed light beam into a pulsed light beam, causing the pulsed light beam to branch, introducing differing offset frequencies to a plurality of branched pulsed light beams, and outputting the plurality of pulsed light beams; an optical amplifier for amplifying the plurality of pulsed light beams output from the modulator; an optical antenna for emitting the plurality of pulsed light beams amplified by the optical amplifier into space, and receiving backscattered light beams of the plurality of emitted pulsed light beams; a receiver for detecting respective beat signals from the plurality of backscattered light beams received by the optical antenna; a filter in which frequency bands each including a frequency of signal components included in the plurality of beat signals detected by the receiver are set as pass bands and frequency bands not including any of the frequencies of the signal components are set as cutoff bands; and a converter for sampling the beat signals passing through the filter at a sampling frequency.

Advantageous Effects of Invention

According to the present disclosure, a laser radar device includes: a modulator for causing a transmission seed light beam to branch, introducing differing offset frequencies to a plurality of branched transmission seed light beams, modulating each of the plurality of transmission seed light beams into a pulsed light beam, and outputting a plurality of pulsed light beams, or for modulating a transmission seed light beam into a pulsed light beam, causing the pulsed light beam to branch, introducing differing offset frequencies to a plurality of branched pulsed light beams, and outputting the plurality of pulsed light beams; a filter in which frequency bands each including a frequency of signal components included in the plurality of beat signals detected by the receiver are set as pass bands and frequency bands not including any of the frequencies of the signal components are set as cutoff bands; and a converter for sampling the beat signals passing through the filter at a sampling frequency. Therefore, an advantageous effect is provided in that the SNR is increased while the influence of the stimulated Brillouin scattering is avoided.

DESCRIPTION OF EMBODIMENTS

Hereinafter, to explain the present disclosure in more detail, embodiments of the disclosure will be described with reference to the accompanying drawings.

Embodiment 1

Figure 1:
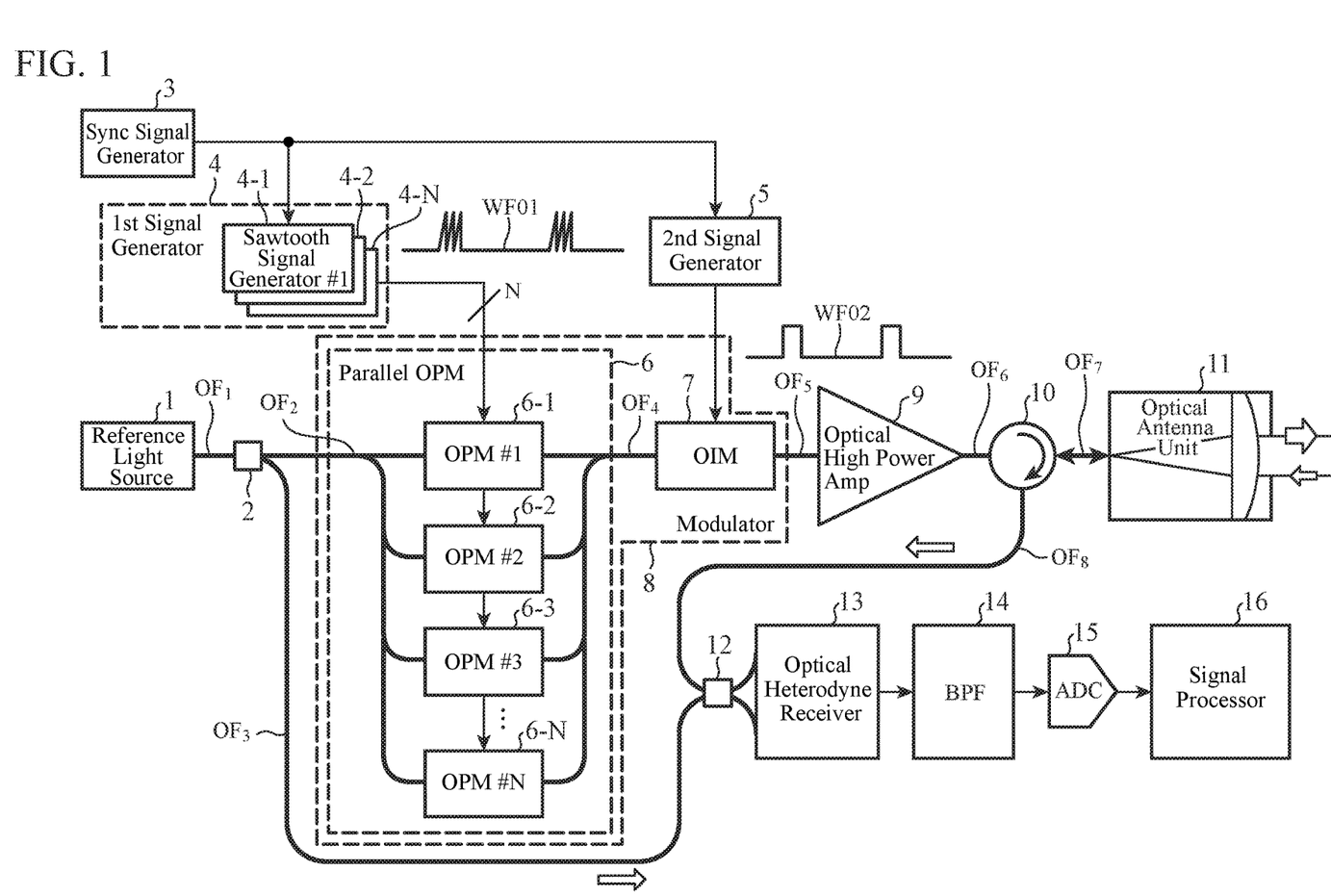
FIG. 1 is a configuration diagram illustrating a laser radar device according to Embodiment 1 of the present disclosure.

FIG. 1 is a configuration diagram illustrating a laser radar device according to Embodiment 1 of the present disclosure.

In FIG. 1, a reference light source 1 is a light source for oscillating transmission seed light beam of a single frequency and outputting the transmission seed light beam to a transmission path $OF_1$.

The transmission path $OF_1$ is an optical fiber for transmitting the transmission seed light beam output from the reference light source 1 to an optical path branch coupler 2.

The optical path branch coupler 2 causes the transmission seed light beam output from the reference light source 1 to the transmission path $OF_1$ to branch into two transmission seed light beams. It outputs one of the branched transmission seed light beams to a transmission path $OF_2$, and outputs the other of the branched transmission seed light beams as the local oscillation light beam to a transmission path $OF_3$.

The transmission path $OF_2$ is an optical fiber for transmitting the transmission seed light beam output from the optical path branch coupler 2 to a parallel optical phase modulator 6. The transmission path $OF_3$ is an optical fiber for transmitting the local oscillation light beam output from the optical path branch coupler 2 to an optical path multiplexing coupler 12.

A synchronization signal generator 3 is a signal generator that outputs a synchronization signal to a first signal generator 4 and a second signal generator 5.

The first signal generator 4 is a signal generator that includes N sawtooth signal generators 4-1 to 4-N for generating, in synchronization with the synchronization signal output from the synchronization signal generator 3, sawtooth signals $sw_1$ to $sw_N$ as drive signals to drive optical phase modulators 6-1 to 6-N.

The sawtooth signal generator 4-n (n=1, 2, 3, . . . , N) is a signal generator for outputting the sawtooth signals $sw_1$ to $sw_N$ like a signal waveform WF01 to the optical phase modulator 6-n.

The sawtooth signal $sw_n$ is a signal having a period of $1/f_{ofs\_n}$ and an amplitude of $2\times V\pi$ in an ON time period (during which the amplitude is not zero) of pulsed light to be output from an optical intensity modulator 7. In addition, the sawtooth signal $sw_n$ is a signal having an amplitude of zero in an OFF time period during which the amplitude of the pulsed light beam is zero. The $F_{ofs\_n}$ is an offset frequency. The $V\pi$ is a drive voltage necessary for providing a phase change of 180 degrees to the parallel optical phase modulator 6.

Offset frequencies $f_{ofs\_1}$ to $f_{ofs\_N}$ are set in the respective sawtooth signal generators 4-1 to 4-N so that frequency intervals of the offset frequencies $f_{ofs\_1}$ to $f_{ofs\_N}$ are larger than a gain bandwidth of stimulated Brillouin scattering.

The second signal generator 5 is a signal generator for generating a drive signal for driving the optical intensity modulator 7 in synchronization with the synchronization signal output from the synchronization signal generator 3. The drive signal is a signal having a rectangular waveform like a signal waveform WF02.

The parallel optical phase modulator 6 includes the N optical phase modulators 6-1 to 6-N. It branches the transmission seed light beam output from the optical path branch coupler 2 to the transmission path $OF_2$ into N transmission seed light beams, and on the basis of the sawtooth signals $sw_1$ to $sw_N$ output from the first signal generator 4, introduces the different offset frequencies $f_{ofs\_1}$ to $f_{ofs\_N}$ to the branched N transmission seed light beams, respectively.

The optical phase modulator 6-n (n=1, 2, 3, . . . , N), on the basis of the sawtooth signal $sw_n$ output from the sawtooth signal generator 4-n, introduces the offset frequency $f_{ofs\_n}$ to one of the transmission seed light beams having branched, and outputs to a transmission path $OF_4$ the transmission seed light beam to which the offset frequency has been introduced.

The transmission path $OF_4$ is an optical fiber for transmitting the transmission seed light beams output from the optical phase modulators 6-1 to 6-N, each of the transmission seed light beams being introduced an offset frequency, to the optical intensity modulator 7.

The optical intensity modulator 7 is driven by the drive signal output from the second signal generator 5 to modulate the N transmission seed light beams output from the parallel optical phase modulator 6 to the transmission path $OF_4$ into a pulsed light beam, each of the transmission seed light beams being introduced an offset frequency, and outputs the pulsed light beam to a transmission path $OF_5$.

In the optical intensity modulator 7, the transmission seed light beams to which the offset frequencies have been introduced are modulated into a pulsed light beam having a pulse repetition frequency of $f_{prf}$ [kHz] and a pulse width of an ON time period $\Delta t$.

The transmission path $OF_5$ is an optical fiber for transmitting the pulsed light beam output from the optical intensity modulator 7 to an optical high power amplifier 9.

In Embodiment 1, an example is described in which the modulator 8 includes the parallel optical phase modulator 6 and the optical intensity modulator 7, and the parallel optical phase modulator 6 is arranged before the optical intensity modulator 7; however, the optical intensity modulator 7 may be arranged before the parallel optical phase modulator 6.

In the latter case, the optical intensity modulator 7 modulates transmission seed light beam output from the reference light source 1 into a pulsed light beam, and then the parallel optical phase modulator 6 causes the modulated pulsed light beam to branch and introduces differing offset frequencies to the branched pulsed light beams. The parallel optical phase modulator 6 outputs a pulsed light beam to which the offset frequencies have been introduced to the optical high power amplifier 9.

The optical high power amplifier 9 is an optical amplifier for amplifying the pulsed light beam to which the offset frequencies have been introduced output from the optical intensity modulator 7 to the transmission path $OF_5$, and outputting the amplified pulsed light beam to a transmission path $OF_6$.

The optical high power amplifier 9 is an optical fiber amplifier to which rare earth, such as erbium (Er), ytterbium (Yb), neodymium (Nd), is doped. Based on the cumulative effect of amplification medium, the optical fiber amplifier amplifies the pulsed light beams by accumulating energy during the OFF time period of the pulsed light beams provided from the transmission path $OF_6$, and then releasing the accumulated energy during the ON time period of the pulsed light beams.

The transmission path $OF_6$ is an optical fiber for transmitting the pulsed light beam output from the optical high power amplifier 9 to an optical circulator 10.

The optical circulator 10 outputs the pulsed light beam, output from the optical high power amplifier 9 to the transmission path $OF_6$, to a transmission path $OF_7$, and also outputs a backscattered light beam, output from an optical antenna unit 11 to the transmission path $OF_7$, to a transmission path $OF_8$.

The transmission path $OF_7$ is an optical fiber for transmitting the pulsed light beam output from the optical circulator 10 to the optical antenna unit 11, and also transmitting the backscattered light beam output from the optical antenna unit 11 to the optical circulator 10.

The transmission path $OF_8$ is an optical fiber for transmitting the backscattered light beam output from the optical circulator 10 to the optical path multiplexing coupler 12.

The optical antenna unit 11 includes an optical antenna for expanding the beam diameter of the pulsed light beam output from the optical circulator 10 to the transmission path $OF_7$, and emitting the pulsed light beam to space in a predetermined direction.

In addition, the optical antenna unit 11 includes an optical antenna for receiving the backscattered light beam of the pulsed light beam backscattered by a scattering object existing in the space after emitting the pulsed light beam into the space, and outputting the backscattered light beam to the transmission path $OF_7$.

The optical antenna emitting the pulsed light beam and the optical antenna receiving the backscattered light beam may be separately provided in the optical antenna unit 11 or may be commonly used.

The scattering object is, for example, an aerosol moving at the same velocity as a wind velocity, and the backscattered light beam is shifted by a Doppler frequency shift $f_{Dop}$ depending on a moving velocity of the scattering object.

The optical path multiplexing coupler 12 multiplexes the local oscillation light beam output from the optical path branch coupler 2 to the transmission path $OF_3$ with the backscattered light beams output from the optical circulator 10 to the transmission path $OF_8$, thereby converting the frequency of the backscattered light beams.

An optical heterodyne receiver 13 is a receiver for outputting beat signals having a difference frequency between the backscattered light beams and the local oscillation light beam by carrying out optical heterodyne detection of the backscattered light beams whose frequency has been converted by the optical path multiplexing coupler 12.

A band pass filter 14 is an electric filter in which frequency bands including a frequency of signal components included in the beat signals output from the optical heterodyne receiver 13 are set as the pass bands and frequency bands not including any frequency of the signal components are set as the cutoff band.

An ADC 15 is a converter for undersampling (sampling) the beat signals having passed through the band pass filter 14 at a sampling frequency, and converting a beat signal obtained after the undersampling from analog signal to digital signal.

A signal processor 16 is a processor for analyzing the beat signal converted into the digital signal by the ADC 15.

Next, the operation will be described.

The reference light source 1 continuously oscillates a transmission seed light beam of the single frequency, and outputs the transmission seed light beam to the transmission path $OF_1$ with constant polarization.

When receiving the transmission seed light beam output from the reference light source 1 to the transmission path $OF_1$, the optical path branch coupler 2 causes the transmission seed light beam to branch into two transmission seed light beams, maintaining a polarization state of the transmission seed light beam.

The optical path branch coupler 2 outputs one of the transmission seed light beams having branched to the transmission path $OF_2$, and outputs the other of the transmission seed light beams having branched to the transmission path $OF_3$ as the local oscillation light beam.

The transmission seed light beam output from the optical path branch coupler 2 to the transmission path $OF_2$ is caused to branch into N in the parallel optical phase modulator 6, and the respective transmission seed light beams having branched into N are input to the optical phase modulators 6-1 to 6-N.

The synchronization signal generator 3 outputs the synchronization signal to the first signal generator 4 and the second signal generator 5.

When receiving the synchronization signal from the synchronization signal generator 3, the sawtooth signal generators 4-1 to 4-N of the first signal generator 4 generate the sawtooth signals $sw_1$ to $sw_n$, as the drive signals for driving the optical phase modulators 6-1 to 6-N, in synchronization with the synchronization signal.

In the ON time period of the pulsed light beam output from the optical intensity modulator 7, the sawtooth signal $sw_n$ generated by the sawtooth signal generator 4-$n$ (n=1, 2, 3, ..., N) is a signal having the period of $1/f_{ofs\_n}$ and the amplitude of 2×Vn. In addition, the sawtooth signal $sw_n$ is a signal having the amplitude of zero in the OFF time period of the pulsed light beam output from the optical intensity modulator 7. The $f_{ofs\_n}$ is the offset frequency.

In the sawtooth signal generators 4-1 to 4-N, the offset frequencies $f_{ofs\_1}$ to $f_{ofs\_N}$ are set so that the frequency intervals of the offset frequencies $f_{ofs\_1}$ to $f_{ofs\_N}$ are larger than the gain bandwidth of the stimulated Brillouin scattering generated in the optical high power amplifier 9 or the transmission paths $OF_6$ and $OF_7$.

It is known that the gain bandwidth of the stimulated Brillouin scattering generated in the optical high power amplifier 9 or the transmission paths $OF_6$ and $OF_7$ is about 10 to 100 MHz. If the frequency intervals of the pulsed light beams incident on the optical high power amplifier 9 are larger than 100 MHz, the optical power of the pulsed light beam of each wavelength can be increased within a range not exceeding an occurrence threshold of the stimulated Brillouin scattering, in the optical high power amplifier 9.

For this reason, in Embodiment 1, the offset frequencies $f_{ofs\_1}$ to $f_{ofs\_N}$ are set so that the frequency intervals of the offset frequencies $f_{ofs\_1}$ to $f_{ofs\_N}$ are secured at greater than or equal to 200 MHz.

If the frequency intervals of the offset frequencies $f_{ofs\_1}$ to $f_{ofs\_N}$ are secured at greater than or equal to 100 MHz, influence of the stimulated Brillouin scattering can be avoided; however, since the band pass filter 14 in which the pass band of 100 MHz and the cutoff band of 100 MHz are alternately set is provided for the purpose of increasing the SNR, the frequency intervals are secured at greater than or equal to 200 MHz.

The offset frequency $f_{ofs\_n}$ (n=1, 2, 3, ..., N) is expressed by Equation (1) below.

$$f_{ofs\_n} + (3/2 + 2 \times (N-1)) \times f_{nyq} \quad (1)$$

In Eq. (1), $f_{nyq}$ is the Nyquist frequency (=sampling frequency/2) in the sampling by the ADC 15.

For example, if the number N of the optical phase modulators 6-1 to 6-N mounted on the parallel optical phase modulator 6 is there, the offset frequencies $f_{ofs\_1}$ to $f_{ofs\_3}$ are expressed by Equations (2) below.

$$f_{ofs\_1} = 3/2 \times f_{nyq}$$

$$f_{ofs\_2} = 7/2 \times f_{nyq}$$

$$f_{ofs\_3} = 11/2 \times f_{nyq} \quad (2)$$

Figure 2:
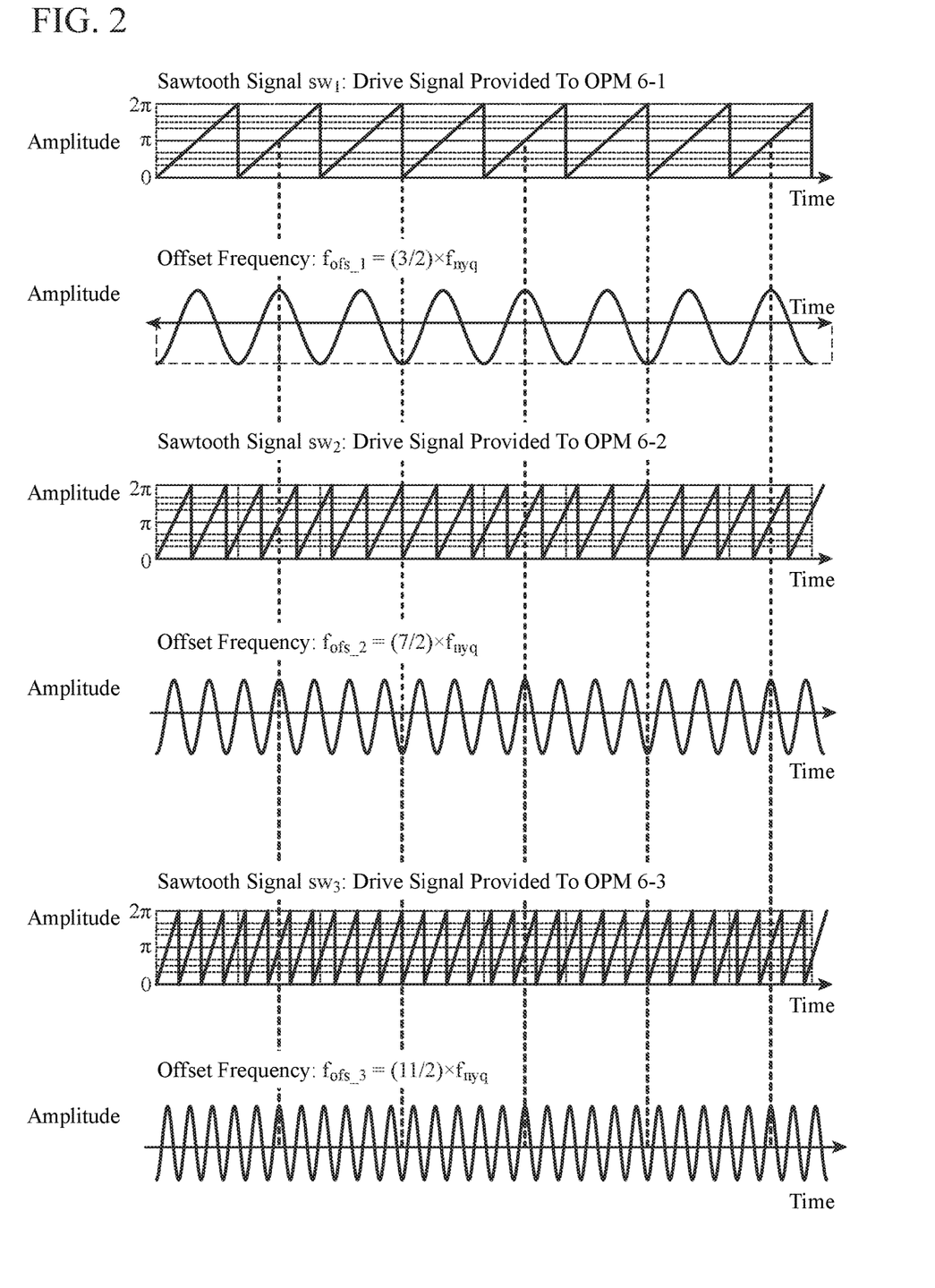
FIG. 2 is an explanatory diagram illustrating a relationship between sawtooth signals $sw_1$ to $sw_3$ that are drive signals output from sawtooth signal generators 4-1 to 4-3 to optical phase modulators 6-1 to 6-3, and respective offset frequencies $f_{ofs\_1}$ to $f_{ofs\_3}$.

FIG. 2 is an explanatory diagram illustrating a relationship between the sawtooth signals $sw_1$ to $sw_3$ that are the drive signals output from the sawtooth signal generators 4-1 to 4-3 to the optical phase modulators 6-1 to 6-3, and the offset frequencies $f_{ofs\_1}$ to $f_{ofs\_3}$.

As illustrated in FIG. 2, the sawtooth signals $sw_1$ to $sw_3$ output from the sawtooth signal generators 4-1 to 4-3 to the optical phase modulators 6-1 to 6-3 have the same initial phase.

The offset frequency $f_{ofs\_1}$ corresponds to the sawtooth signal $sw_1$, the offset frequency $f_{ofs\_2}$ corresponds to the sawtooth signal $sw_2$, and the offset frequency $f_{ofs\_3}$ corresponds to the sawtooth signal $sw_3$.

The parallel optical phase modulator 6 causes the transmission seed light beam output from the optical path branch coupler 2 to the transmission path $OF_2$ to branch into N, and on the basis of the sawtooth signals $sw_1$ to $sw_N$ output from the first signal generator 4, introduces the differing offset frequencies $f_{ofs\_1}$ to $f_{ofs\_N}$ to the N transmission seed light beams having branched.

That is, the optical phase modulator 6-n (n=1, 2, 3, ..., N), on the basis of the sawtooth signal $sw_n$ output from the sawtooth signal generator 4-n, introduces the offset frequency $f_{ofs\_n}$ to one of the transmission seed light beams having branched, and outputs the transmission seed light beam to which the offset frequency has been introduced to the transmission path $OF_4$.

Since the offset frequencies $f_{ofs\_1}$ to $f_{ofs\_N}$ having the frequency intervals of greater than or equal to 200 MHz are introduced to the N transmission seed light beams output from the parallel optical phase modulator 6 to the transmission path $OF_4$, frequency intervals of the N transmission seed light beams are greater than or equal to 200 MHz.

When receiving the synchronization signal from the synchronization signal generator 3, the second signal generator 5 generates the drive signal for driving the optical intensity modulator 7 in synchronization with the synchronization signal. This drive signal is the signal like the signal waveform WF02.

The optical intensity modulator 7 is driven by the drive signal output from the second signal generator 5, and modulates the N transmission seed light beams, to which the offset frequencies have been introduced, that are output from the parallel optical phase modulator 6 to the transmission path $OF_4$ into a pulsed light beam and outputs the pulsed light beam to the transmission path $OF_5$.

The optical intensity modulator 7 modulates the N transmission seed light beams to which the offset frequencies have been introduced into the pulsed light beam having the pulse repetition frequency of $f_{prf}$ [kHz] and the pulse width of the ON time period Δt.

Note that, in a case where the laser radar device of FIG. 1 is used as a wind measurement LIDAR device, for example, an optical frequency ν of 195 THz, the pulse repetition frequency $f_{prf}$ of several kHz to several tens of kHz, and the pulse width Δt of several hundred nsec to several μsec are used. In addition, the offset frequencies of $f_{ofs\_1}$=150 MHz, $f_{ofs\_2}$=350 MHz, and $f_{ofs\_3}$=550 MHz are used, and the Nyquist frequency $f_{nyq}$ of 100 MHz is used.

When receiving the N pulsed light beams from the optical intensity modulator 7, the optical high power amplifier 9 amplifies each of the N pulsed light beams, and outputs the amplified N pulsed light beams to the transmission path $OF_6$.

The optical high power amplifier 9 is, for example, the optical fiber amplifier to which rare earth, such as erbium (Er), ytterbium (Yb), neodymium (Nd), is doped. For this reason, the optical high power amplifier 9 amplifies the pulsed light beam by releasing energy accumulated during the OFF time period of the pulsed light beam from the transmission path $OF_6$, during the ON time period, by utilizing the cumulative action of the amplification medium.

In Embodiment 1, since the frequency intervals of the offset frequencies $f_{ofs\_1}$ to $f_{ofs\_N}$ are greater than or equal to 200 MHz, the frequency intervals of the N pulsed light beams are frequency differences of greater than or equal to 100 MHz that is the gain bandwidth of the stimulated Brillouin scattering.

For this reason, output power of the optical high power amplifier 9 can be increased to N times.

When receiving the N pulsed light beams output from the optical high power amplifier 9 to the transmission path $OF_6$, the optical circulator 10 outputs the N pulsed light beams to the transmission path $OF_7$.

The optical antenna of the optical antenna unit 11 expands the beam diameter of the N pulsed light beams output from the optical circulator 10 to the transmission path $OF_7$ and emits the N pulsed light beams to the space in the predetermined direction.

The N pulsed light beams emitted from the optical antenna into space are backscattered by the scattering object existing in the space. The scattering object is, for example, the aerosol moving at the same velocity as the wind velocity.

Figure 3:
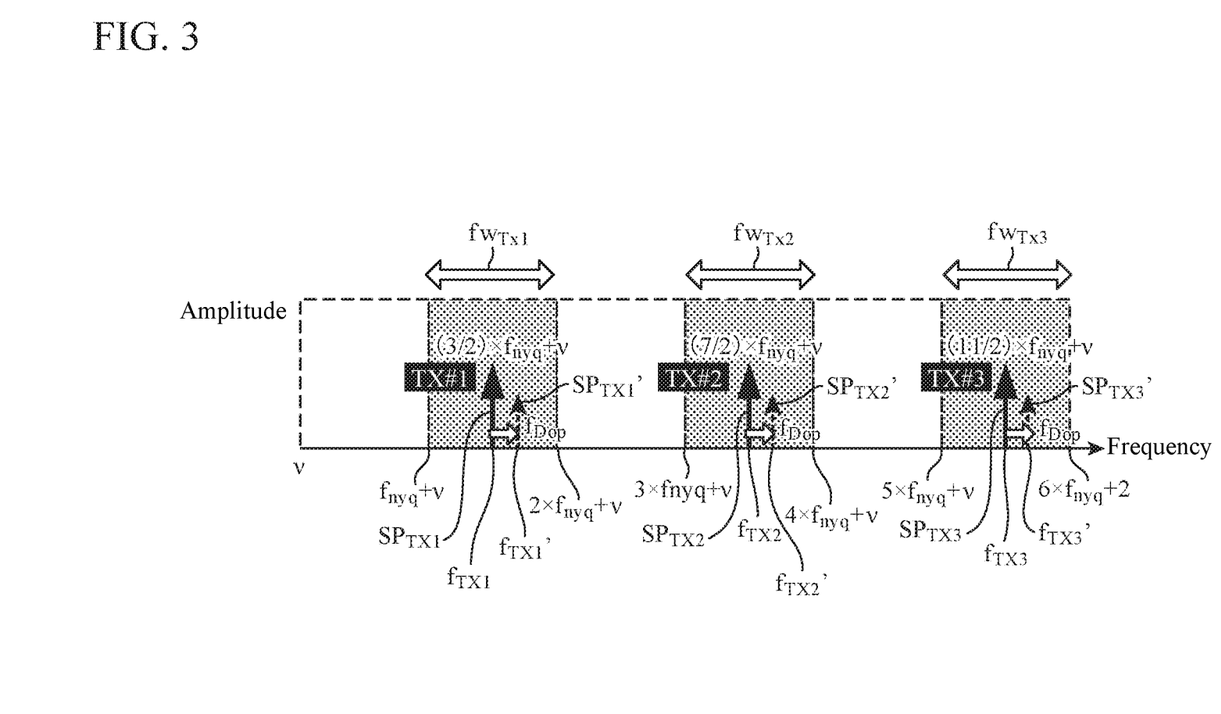
FIG. 3 is an explanatory diagram illustrating spectra of pulsed light beams emitted from an optical antenna of an optical antenna unit 11.

FIG. 3 is an explanatory diagram illustrating a spectrum of the pulsed light beam emitted from the optical antenna of the optical antenna unit 11.

In FIG. 3, the horizontal axis denotes frequency and the vertical one denotes amplitude.

The scale on the horizontal axis in FIG. 3 is illustrated with the frequency v of the reference light source 1 as a starting point, and the Nyquist frequency $f_{nyq}$ as an increment.

A spectral component $SP_{TX1}$ of the pulsed light beam to which the offset frequency $f_{ofs\_1}$ is introduced by the optical phase modulator 6-1 is positioned at a frequency between a frequency $(f_{nyq}+v)$ and a frequency $(2\times f_{nyq}+v)$.

A spectral component $SP_{TX2}$ of the pulsed light beam to which the offset frequency $f_{ofs\_2}$ is introduced by the optical phase modulator 6-2 is positioned at a frequency between a frequency $(3\times f_{nyq}+v)$ and a frequency $(4\times f_{nyq}+v)$.

In addition, a spectral component $SP_{TX3}$ of the pulsed light beam to which the offset frequency $f_{ofs\_3}$ is introduced by the optical phase modulator 6-3 is positioned at a frequency between a frequency $(5\times f_{nyq}+v)$ and a frequency $(6\times f_{nyq}+v)$.

Frequencies $f_{TX1}$, $f_{TX2}$ and $f_{TX3}$ of the spectral components $SP_{TX1}$, $SP_{TX2}$ and $SP_{TX3}$ are respectively expressed by Equations (3) below.

$$f_{TX1}=3/2\times f_{nyq}+v$$

$$f_{TX2}=7/2\times f_{nyq}+v$$

$$f_{TX3}=11/2\times f_{nyq}+v \qquad (3)$$

Since the pulsed light beam having the spectral component $SP_{TX1}$, the pulsed light beam having the $SP_{TX2}$, and the pulsed light beam having the $SP_{TX3}$ are propagated at the same time and in the same space, the pulsed light beams each are shifted by an equal amount of the Doppler frequency shift $f_{Dop}$ by an aerosol that is a scattering object. The spectral components $SP_{TX1}$, $SP_{TX2}$ and $SP_{TX3}$ of the pulsed light beams are therefore shifted to positions of spectral components $SP_{TX1}'$, $SP_{TX2}'$ and $SP_{TX3}'$, respectively.

Frequencies $f_{TX1}'$, $f_{TX2}'$ and $f_{TX3}'$ of the spectral components $SP_{TX1}'$, $SP_{TX2}'$ and $SP_{TX3}'$ are expressed by Equations (4) below.

$$f_{TX1}'=3/2\times f_{nyq}+v+f_{DOP}$$

$$f_{TX2}'=7/2\times f_{nyq}+v+f_{DOP}$$

$$f_{TX3}'=11/2\times f_{nyq}+v+f_{DOP} \qquad (4)$$

FIG. 3 illustrates an example in which the pulsed light beam is shifted in the positive direction on the assumption that a head wind blows with respect to the emission direction of the pulsed light beam emitted from the optical antenna; however, in a situation where a tail wind blows with respect to the emission direction of the pulsed light beam, the pulsed light beam is shifted in the negative direction.

In a case where the Nyquist frequency $f_{nyq}$ is set on the basis of a maximum wind velocity $\pm V_{LOS\_MAX}$ in the line-of-sight direction that can be measured as expressed in Inequality (5) below, the Doppler frequency shift $f_{DOP}$ falls within each range of $\pm(1/2)\times f_{nyq}$ with the spectral component $SP_{TX1}$, $SP_{TX2}$ or $SP_{TX3}$ as a center spectral component.

Existing ranges of the spectral components $SP_{TX1}'$, $SP_{TX2}'$ and $SP_{TX3}'$ whose positions are shifted by the wind velocity therefore respectively become the ranges $fw_{TX1}$, $fw_{TX2}$ and $fw_{TX3}$ definite on the frequency axis.

$$f_{nyq} \geq \frac{4\times v\times V_{LOS\_MAX}}{c} \qquad (5)$$

In Ineq. (5), c is the velocity of light.

For example, if the maximum wind velocity $\pm V_{LOS\_MAX}$ in the line-of-sight direction is 38 m/s and the frequency v of the reference light source 1 is 195 THz, the Nyquist frequency is calculated as $f_{nyq} \geq 98.8$ MHz, so that the Nyquist frequency $f_{nyq}$ is set to about 100 MHz.

The optical antenna of the optical antenna unit 11 emits the N pulsed light beams into the space, and then receives the backscattered light beams of the pulsed light beams backscattered by the scattering object existing in the space, and outputs the backscattered light beams to the optical transmission path $OF_7$.

The backscattered light beams backscattered by the scattering object are continuously received by the optical antenna during the OFF time period of the pulsed light beams emitted from the optical antenna.

A reception time period of the backscattered light beam corresponding to a distance $L_m(i)$ from the optical antenna to the scattering object is a time width $\Delta t$, and a time $t_m(i)$ from when the pulsed light beam is emitted from the optical antenna until the backscattered light beam is received is expressed by Equation (6) below. The i is a parameter indicating the i-th distance range.

$$t_m(i) = \frac{2}{c}L_m(i) \qquad (6)$$

When receiving the backscattered light beam output from the optical antenna unit 11 to the transmission path $OF_7$, the optical circulator 10 outputs the backscattered light beam to the transmission path $OF_8$.

The optical path multiplexing coupler 12 multiplexes the local oscillation light beam output from the optical path branch coupler 2 to the transmission path $OF_3$ with the backscattered light beam output from the optical circulator 10 to the transmission path $OF_8$, thereby converting the frequency of the backscattered light beam.

The optical heterodyne receiver 13 outputs the beat signals having the difference frequency between the backscattered light beams and the local oscillation light beam to the band pass filter 14 by carrying out optical heterodyne detection of the backscattered light beams whose frequency has been converted by the optical path multiplexing coupler 12. The beat signals output from the optical heterodyne receiver 13 are electric signals.

In Embodiment 1, of the beat signals that are continuously output from the optical heterodyne receiver 13, the beat signals received in a reception time period of the backscattered light beams corresponding to an i-th distance range will be described; however, the beat signals of other than the i-th distance range are handled similarly.

Figure 4A:
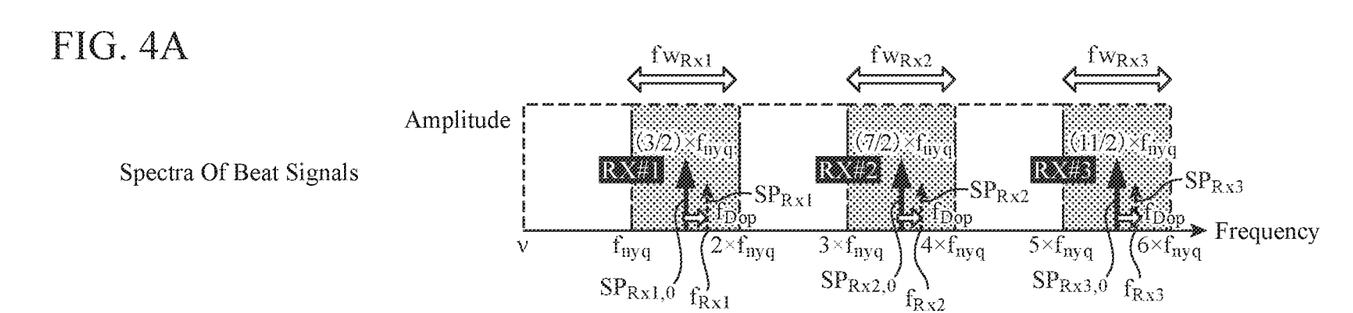
FIG. 4A is an explanatory diagram illustrating spectra of beat signals detected by an optical heterodyne receiver 13.
Figure 4B:
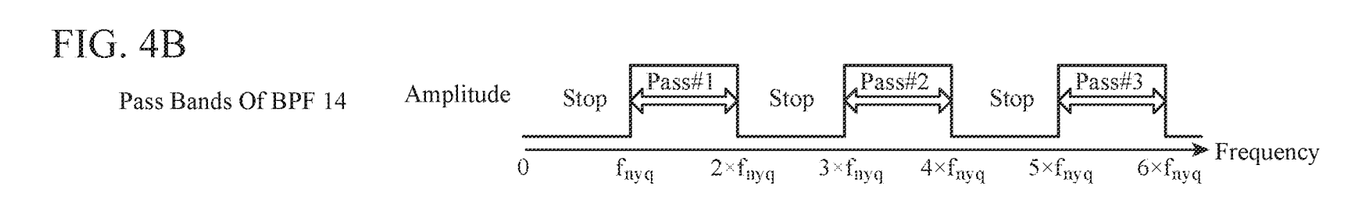
FIG. 4B is an explanatory diagram illustrating pass bands and cutoff bands set in a band pass filter 14.
Figure 4C:
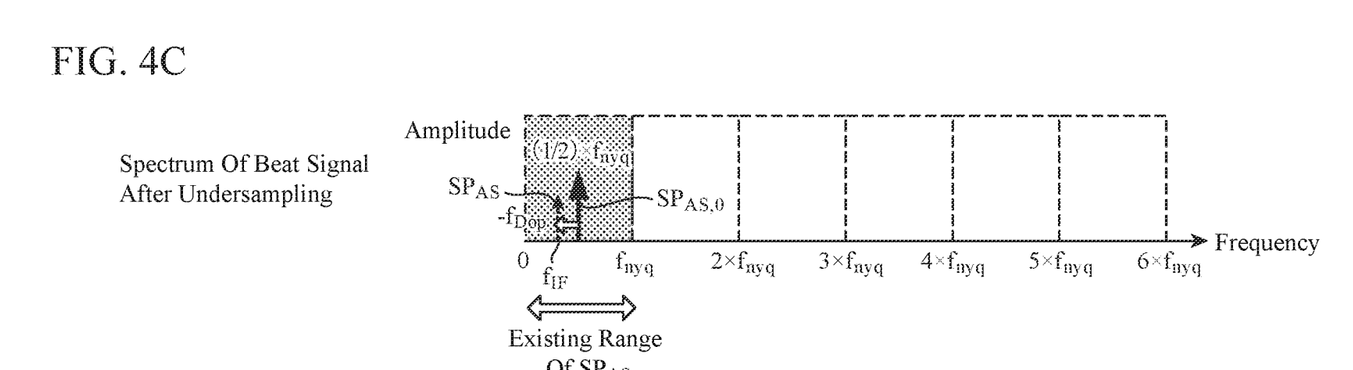
FIG. 4C is an explanatory diagram illustrating a spectrum of a beat signal obtained after an ADC 15 performs under-sampling.

Here, FIG. 4 is an explanatory diagram illustrating spectra of beat signals and other related matters.

In FIG. 4, the horizontal axis denotes frequency and the vertical one denotes amplitude.

The scale on the horizontal axis of FIG. 4 is illustrated with the Nyquist frequency $f_{nyq}$ as an increment.

FIG. 4A illustrates spectra of the beat signals detected by the optical heterodyne receiver 13, and FIG. 4B illustrates pass bands and cutoff bands set in the band pass filter 14. In addition, FIG. 4C illustrates a spectrum of a beat signal obtained after the undersampling by the ADC 15.

A spectrum $SP_{RX1}$ of the beat signal output from the optical heterodyne receiver 13 corresponds to the spectrum $SP_{TX1}'$ of the pulsed light beam, and a spectrum $SP_{RX2}$ of the beat signal output from the optical heterodyne receiver 13 corresponds to the spectrum $SP_{TX2}'$ of the pulsed light beam.

In addition, a spectrum $SP_{RX3}$ of the beat signal output from the optical heterodyne receiver 13 corresponds to the spectrum $SP_{TX3}'$ of the pulsed light beam.

In FIG. 4A, it is assumed that a frequency of the beat signal spectrum $SP_{RX1}$ is $f_{RX1}$, a frequency of the beat signal spectrum $SP_{RX2}$ is $f_{RX2}$, and a frequency of the beat signal spectrum $SP_{RX3}$ is $f_{RX3}$.

As expressed in Equations (7), the frequencies $f_{RX1}$, $f_{RX2}$ and $f_{RX3}$ are frequencies obtained by subtracting the frequency v of the local oscillation light beam from the frequencies of the spectral components $SP_{TX1}'$, $SP_{TX2}'$ and $SP_{TX3}'$ of the pulsed light beam.

$$f_{RX1} = \frac{3}{2} \times f_{nyq} + f_{DOP} \qquad (7)$$

$$f_{RX2} = \frac{7}{2} \times f_{nyq} + f_{DOP}$$

$$f_{RX3} = \frac{11}{2} \times f_{nyq} + f_{DOP}$$

Since the Nyquist frequency $f_{nyq}$ is set on the basis of the maximum wind velocity $\pm V_{LOS\_MAX}$ in the line-of-sight direction that can be measured, each of the spectra $SP_{RX1}$, $SP_{RX2}$ and $SP_{RX3}$ of the beat signals falls within a range of $\pm(\frac{1}{2}) \times f_{nyq}$ of respective center spectra $SP_{TX1,0}$, $SP_{TX2,0}$ and $SP_{TX3,0}$, each of which is a spectrum indicating a case where the wind velocity is zero.

Existing ranges of the spectra $SP_{RX1}$, $SP_{RX2}$ and $SP_{RX3}$ of the beat signals are therefore ranges $fw_{RX1}$, $fw_{RX2}$ and $fw_{RX3}$ definite on the frequency axis.

In the band pass filter 14, frequency bands are set in the pass bands Pass #1, #2 and #3, the frequency bands including the frequencies $f_{RX1}$, $f_{RX2}$ and $f_{RX3}$ of the spectra $SP_{RX1}$, $SP_{RX2}$ and $SP_{RX3}$ that are signal components included in the beat signals output from the optical heterodyne receiver 13.

In addition, in the band pass filter 14, frequency bands not including any of the frequencies $f_{RX1}$, $f_{RX2}$ and $f_{RX3}$ of the spectral components $SP_{RX1}$, $SP_{RX2}$ and $SP_{RX3}$ are set as being cutoff bands Stop.

The pass bands Passes #1, #2 and #3, and the cutoff bands Stop set in the band pass filter 14 are set, for example, as illustrated in FIG. 4B.

Pass #1=1×$f_{nyq}$ to 2×$f_{nyq}$
Pass #2=3×$f_{nyq}$ to 4×$f_{nyq}$
Pass #3=5×$f_{nyq}$ to 6×$f_{nyq}$ Although not illustrated in FIG. 4, a pass band Pass #N is as follows.

Pass #N=(2×N-1)×$f_{nyq}$ to (2×N)×$f_{nyq}$

Since the spectra $SP_{RX1}$, $SP_{RX2}$ and $SP_{RX3}$ of the beat signals output from the optical heterodyne receiver 13 are within ranges of the pass bands Pass #1, #2, and #3 of the band pass filter 14, they pass through the band pass filter 14 and are input to the ADC 15.

On the other hand, since noise components in the cutoff bands Stop of the band pass filter 14 in which any of the spectral components $SP_{RX1}$, $SP_{RX2}$ and $SP_{RX3}$ of the beat signals does not exist are blocked by the band pass filter 14, the noise components are not input to the ADC 15.

The ADC 15 undersamples the spectra $SP_{RX1}$, $SP_{RX2}$ and $SP_{RX3}$ of the beat signals having passed through the band pass filter 14 at a sampling frequency 2×$f_{nyq}$, and converts the spectral components $SP_{RX1}$, $SP_{RX2}$ and $SP_{RX3}$ undersampled from an analog signal to digital signals.

By the undersampling by the ADC 15, a signal having a frequency greater than or equal to the Nyquist frequency $f_{nyq}$ that is a half of the sampling frequency 2×$f_{nyq}$ is folded back on the frequency axis.

For example, because the spectrum $SP_{RX1}$ of the beat signal having passed through the band pass filter 14 is folded back once on the frequency axis by the ADC 15, the spectrum $SP_{RX1}$ is subjected to frequency conversion into a spectrum $SP_{AS}$ as illustrated in FIG. 4C. A frequency $f_{IF}$ of the spectral component $SP_{AS}$ that is a frequency $f_{IF1}$ after the conversion of the spectral component $SP_{RX1}$ is expressed by Equation (8) below.

$$f_{IF1} = f_{nyq} + (f_{nyq} - f_{RX1}) \qquad (8)$$

$$= 2 \times f_{nyq} - \left(\frac{3}{2} \times f_{nyq} + f_{DOP}\right)$$

$$= \frac{1}{2} \times f_{nyq} - f_{DOP}$$

$$= f_{IF}$$

Because the spectrum $SP_{RX2}$ of the beat signal having passed through the band pass filter 14 is folded back three times on the frequency axis by the ADC 15, the spectrum $SP_{RX2}$ is subjected to frequency conversion into the spectrum $SP_{AS}$ similarly to the spectrum $SP_{RX1}$ of the beat signal. The frequency $f_{IF}$ of the spectrum $SP_{AS}$ that is a frequency $f_{IF2}$ after the conversion of the spectrum $SP_{RX2}$ is expressed by the Equation (9) below.

$$f_{IF2} = f_{nyq} + (3 \times f_{nyq} - f_{RX2}) \qquad (9)$$

$$= 4 \times f_{nyq} - \left(\frac{7}{2} \times f_{nyq} + f_{DOP}\right)$$

$$= \frac{1}{2} \times f_{nyq} - f_{DOP}$$

$$= f_{IF}$$

Because the spectrum $SP_{RX3}$ of the beat signal having passed through the band pass filter 14 is folded back five times on the frequency axis by the ADC 15, the spectrum $SP_{RX3}$ is subjected to frequency conversion into the spectrum $SP_{AS}$ similarly to the spectrum $SP_{RX1}$ of the beat signal. The frequency $f_{IF}$ of the spectrum $SP_{AS}$ that is a frequency $f_{IF3}$ after the conversion of the spectrum $SP_{RX3}$ is expressed by Equation (10) below.

$$f_{IF3} = f_{nyq} + (5 \times f_{nyq} - f_{RX2}) \quad (10)$$

$$= 6 \times f_{nyq} - \left(\frac{11}{2} \times f_{nyq} + f_{DOP}\right)$$

$$= \frac{1}{2} \times f_{nyq} - f_{DOP}$$

$$= f_{IF}$$

Note that, an existing range of the spectral component $SP_{AS}$ is limited to a range of frequency 0 to $f_{nyq}$ on the frequency axis.

In FIG. 4C, the spectrum $SP_{AS,0}$ is a spectrum in which the spectra $SP_{RX1,0}$, $SP_{RX2,0}$, and $SP_{RX3,0}$ of the beat signals in a case where the wind velocity is zero are subjected to frequency conversion by the ADC 15.

Here, although an example has been described in which the spectra $SP_{RX1}$, $SP_{RX3}$ and $SP_{RX3}$ of the beat signals having passed through the band pass filter 14 are subjected to frequency conversion into the spectrum $SP_{AS}$, any spectrum $SP_{RXn}$ (n=1, 2, . . . , N) of beat signals is also subjected to frequency conversion into the same spectrum $SP_{AS}$ as that of the spectrum $SP_{RX1}$.

Note that, the spectrum $SP_{RXn}$ (n=1, 2, . . . , N) of the beat signals is folded back (2×N-1) times on the frequency axis by the ADC 15.

FIG. 5 is an explanatory diagram illustrating beat signals obtained before or after the ADC 15 converting frequencies.

Figure 5A:
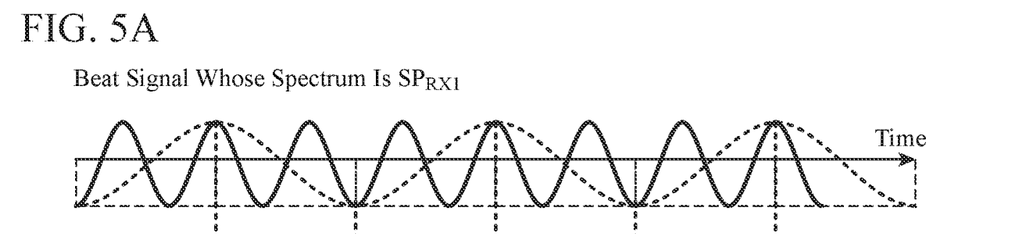
FIG. 5A is an explanatory diagram illustrating a beat signal to which an offset frequency $f_{ofs\_1}$ is introduced and whose spectrum is $SP_{RX1}$.

FIG. 5A illustrates a beat signal to which the offset frequency $f_{ofs\_1}$ is introduced and whose spectrum is $SP_{RX1}$, the solid line is a beat signal before the conversion, and the broken line is a beat signal after the conversion.

Figure 5B:
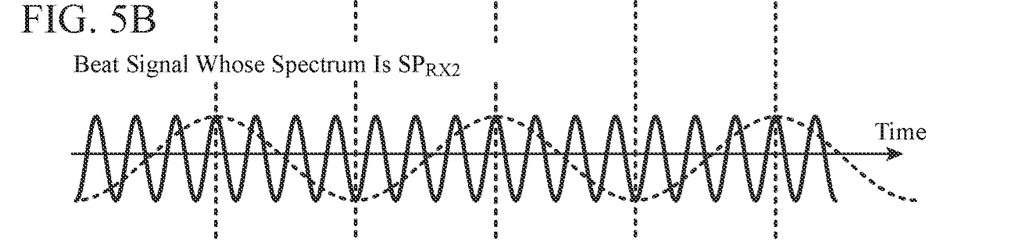
FIG. 5B is an explanatory diagram illustrating a beat signal to which an offset frequency $f_{ofs\_2}$ is introduced and whose spectrum is $SP_{RX2}$.

FIG. 5B illustrates a beat signal to which the offset frequency $f_{ofs\_2}$ is introduced and whose spectrum is $SP_{RX2}$, the solid line is a beat signal before the conversion, and the broken line is a beat signal after the conversion.

Figure 5C:
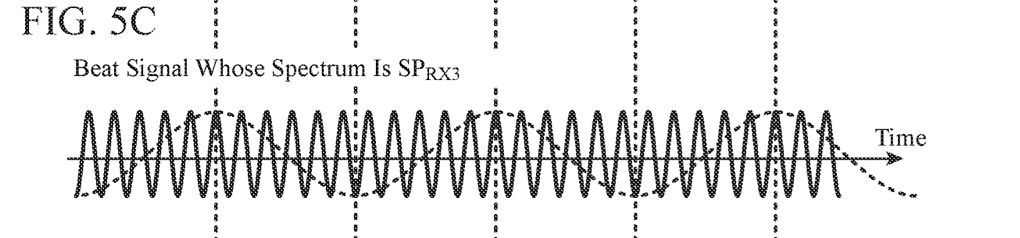
FIG. 5C is an explanatory diagram illustrating a beat signal to which an offset frequency $f_{ofs\_3}$ is introduced and whose spectrum is $SP_{RX3}$.

FIG. 5C illustrates a beat signal to which the offset frequency $f_{ofs\_3}$ is introduced and whose spectrum is $SP_{RX3}$, the solid line is a beat signal before the conversion, and the broken line is a beat signal after the conversion.

Figure 5D:
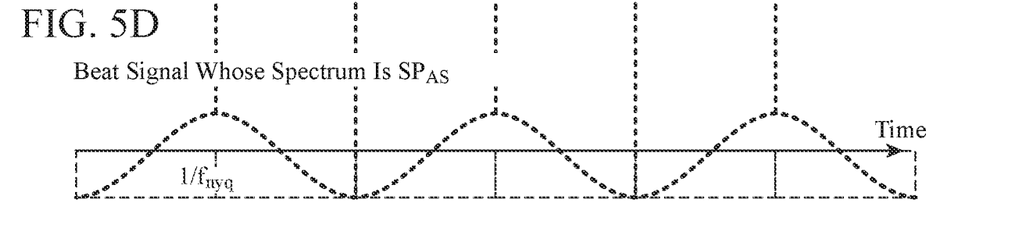
FIG. 5D is an explanatory diagram of a beat signal whose spectrum after conversion of the frequency by the ADC 15 is an $SP_{AS}$ ($SP_{RX1AS}$, $SP_{RX2}$, and $SP_{RX3}$ after the frequency conversion).

FIG. 5D illustrates a beat signal whose spectrum after the conversion of the frequency by the ADC 15 is $SP_{AS}$ ($SP_{RX1AS}$, $SP_{RX2}$, and $SP_{RX3}$ after the frequency conversion).

The N pulsed light beams are emitted into the space in a state where their phases coincide with each other.

In addition, the N pulsed light beams are propagated in the same observation space (the same azimuth, elevation angle, and beam diameter), and are scattered at the same time by the aerosol that is the same observation object in the observation space, so that the N pulsed light beams are shifted by the same Doppler frequency shift $f_{Dop}$.

The backscattered light beams scattered by the same aerosol are received by the optical antenna of the optical antenna unit 11 at the same time, and transmitted through the same transmission paths $OF_7$ and $OF_8$. For this reason, the spectra $SP_{RX1}$, $SP_{RX2}$, and $SP_{RX3}$ of the beat signals are output from the optical heterodyne receiver 13 in the same phase.

The spectra $SP_{RX1AS}$, $SP_{RX2}$, and $SP_{RX3}$ ($=SP_{AS}$) after the conversion of the frequency by the ADC 15 therefore have the same phase, as illustrated in FIG. 5.

As a result, in a case where the N spectra $SP_{RXn}$ (n=1, 2, . . . , N) are undersampled by the ADC 15, the N spectra $SP_{AS}$ are electrically added together, so that the N spectra $SP_{AS}$ are coherently added together in the same phase.

The amplitude of the N spectra $SP_{AS}$ coherently added together in the same phase is N times the amplitude in a case where a pulsed light beam of one wavelength is emitted.

On the other hand, because the noise components included in the pass bands Passes #1, #2, and #3 of the band pass filter 14 are incoherently added together, so that the amplitude of the noise components is $\sqrt{N}$ times the amplitude in the case where the pulsed light beam of one wavelength is emitted. Shot noise is a predominant component in the noise components.

The SNR that is (signal component)/(noise component) is therefore improved to $\sqrt{N}$ times=$N/\sqrt{N}$ as compared with the case where a pulsed light beam of one wavelength is emitted.

The signal processor 16 divides time series digital data that is a digital signal output from the ADC 15 into data of a time gate width corresponding to the pulse width $\Delta t$ of the pulsed light beam.

The signal processor 16 obtains a power spectrum that is a signal in the frequency domain by performing fast Fourier transform on each digital data divided into the data of the time gate width.

When obtaining the power spectrum for the preset number of times N_INT, the signal processor 16 integrates the plural power spectra by adding components of the same frequency in those power spectra together.

When integrating the plural power spectra, the signal processor 16 analyzes a power spectrum after the integration.

Before analyzing the power spectrum after the integration, the signal processor 16 may correct a floor offset value of the power spectrum by using the noise spectrum floor data measured in advance with the optical antenna shielded from light.

Processes of analyzing the power spectrum by the signal processor 16 may include, for example, a process of detecting a peak of the power spectrum, a process of identifying a centroid frequency of the peak by moment calculation, a process of calculating a spectrum width, and a process of calculating the SNR.

Because the digital data of each time gate after the division of the time series digital data corresponds to a measurement distance, it is possible to obtain a distribution of the Doppler frequency corresponding to the wind velocity in the line-of-sight direction for each measurement distance.

Since 1000 to 10000 times are set as N_INT that is the spectral integral number in a normal wind measurement LIDAR, an effective data rate is about 0.1 to several seconds for the pulse repetition frequency $f_{prf}$ of several kHz to several tens of kHz.

Note that, in a case where the signal processor 16 has a function of switching the emission direction of the pulsed light beam emitted from the optical antenna of the optical antenna unit 11, the signal processor 16 can measure a distance to the aerosol and the wind velocity with respect to each emission direction by switching the emission direction of the pulsed light beam. In addition, the signal processor 16 can perform estimation of a three-dimensional distribution of the wind velocity, calculation of a wind direction and velocity distribution for each measurement distance, and the like by performing vector operation using measurement values of the distance and the wind velocity with respect to each emission direction.

The analysis result of the power spectrum by the signal processor 16 is stored in a data storage unit of the signal processor 16, and also displayed on a display (not illustrated) or the like.

As is apparent from the above description, according to Embodiment 1, the laser radar device includes: the modulator 8 for causing transmission seed light beam to branch, and introducing the different offset frequencies to the plurality of transmission seed light beams having branched, and then modulating the plurality of transmission seed light beams into the pulsed light beams and outputting the pulsed light beams, or for modulating the transmission seed light beam into the pulsed light beam, causing the pulsed light beam to branch, and introducing the differing offset frequencies to the plurality of pulsed light beams having branched, and then outputting the plurality of pulsed light beams; the band pass filter 14 in which the frequency band including the frequencies of the signal components included in the plurality of beat signals detected by the optical heterodyne receiver 13 is set as the pass band and the frequency band not including the frequencies of the signal components is set as the cutoff band; and the ADC 15 for sampling the beat signals passing through the band pass filter 14 at the sampling frequency, so that there is an effect that the influence of the stimulated Brillouin scattering can be avoided, and the SNR can be increased.

In addition, according to Embodiment 1, since the laser radar device includes the reference light source 1 for oscillating the transmission seed light beam of the single frequency, and the transmission seed light beam oscillated by the reference light source 1 is output to the modulator 8, an effect can be obtained that it is not necessary to mount a plurality of light sources even in a case where the plurality of pulsed light beams having the different frequencies is introduced to the optical high power amplifier 9 to avoid the influence of the stimulated Brillouin scattering.

In Embodiment 1, an example has been described in which the modulator 8 includes the optical intensity modulator 7 for modulating the transmission seed light beam into the pulsed light beam; however, any device may be used as the optical intensity modulator 7 as long as the device can respond to the pulse width of 100 nsec to 1 μsec, and the pulse repetition frequency $f_{prf}$ of several kHz to several tens of kHz.

As the optical intensity modulator 7, for example, in addition to intensity modulators such as Mach-Zehnder (MZ) type lithium niobate (LN) modulator and an electro absorption (EA) modulator, optical amplifiers such as a semiconductor optical amplifier and an optical fiber amplifier, and optical switches such as a micro electro mechanical system (MEMS) optical switch are conceivable.

In Embodiment 1, an example has been described in which the laser radar device includes the optical high power amplifier 9 for amplifying the plurality of pulsed light beams. As the optical high power amplifier 9, any optical amplifier may be used as long as the optical amplifier has a cumulative action of excitation energy such as of rare earth added glass and YAG crystal, and an amplification action of the pulsed light beam proportional to the reciprocal of the duty ratio of the ON time period and the OFF time period in the pulsed light beam.

As the optical high power amplifier 9, for example, if the optical frequency v of the transmission seed light beam generated from the reference light source 1 is 195 THz (wavelength 1.5 μm), in addition to the optical fiber amplifier to which rare earth such as erbium is added, amplifiers such as a rod type, disc type, or planar waveguide type of erbium and glass, and Raman amplifiers are conceivable.

In Embodiment 1, an example has been described in which the modulator 8 includes the parallel optical phase modulator 6 and the optical intensity modulator 7, and the parallel optical phase modulator 6 is arranged before the optical intensity modulator 7; however, as described above, the optical intensity modulator 7 may be arranged before the parallel optical phase modulator 6.

At this time, as the optical intensity modulator 7, by using a semiconductor optical amplifier, it is possible to use a digital coherent communication integrated tunable wavelength laser module (Integrable Tunable Laser Assembly (ITLA)) in which the reference light source 1, the optical path branch coupler 2, and the optical intensity modulator that is the semiconductor optical amplifier are integrated together. As a result, the number of parts is reduced, so that downsizing and cost reduction can be achieved.

In Embodiment 1, an example has been described in which the laser radar device includes the band pass filter 14 in which the frequency bands including a frequency of the signal components included in the beat signals are set as the pass bands, and the frequency bands not including any frequency of the signal components are set as the cutoff bands. As the band pass filter 14, in addition to a passive type band pass filter including a passive element, an active filter may be used in which active elements such as operational amplifiers are combined.

In a case where the active filter is used as the band pass filter 14, a signal level of the beat signal may be amplified to a signal level necessary for the ADC 15 in the subsequent stage.

In Embodiment 1, an example has been described in which the laser radar device includes the second signal generator 5 for generating the drive signal for the optical intensity modulator 7 that is the signal having the rectangular waveform like the signal waveform WF02.

The drive signal generated by the second signal generator 5 is not limited to the signal having the rectangular waveform like the signal waveform WF02, but may be a signal having a sawtooth waveform with a gentle rise, for example.

If the drive signal generated by the second signal generator 5 is the signal having the sawtooth waveform with the gentle rise, occurrence can be suppressed of a nonlinear optical effect by the optical high power amplifier 9.

In the laser radar device of FIG. 1, the optical path branch coupler 2, the parallel optical phase modulator 6, the optical path multiplexing coupler 12, the optical heterodyne receiver 13, and the transmission paths OF$_2$, OF$_3$, OF$_4$, and OF$_8$ may be mounted on the same substrate. Note that, not only the parallel optical phase modulator 6 that is a part of the modulator 8, but also all of the modulator 8 including the optical intensity modulator 7 may be mounted on the substrate.

As the substrate on which these components are mounted, a substrate using silicon, indium phosphide (InP), organic polymer, or the like is conceivable.

The components are mounted on the same substrate, whereby in addition to the cost reduction and high reliability due to the reduction of the number of parts, an effect can be obtained of downsizing by integrated mounting.

Embodiment 2

Figure 6:
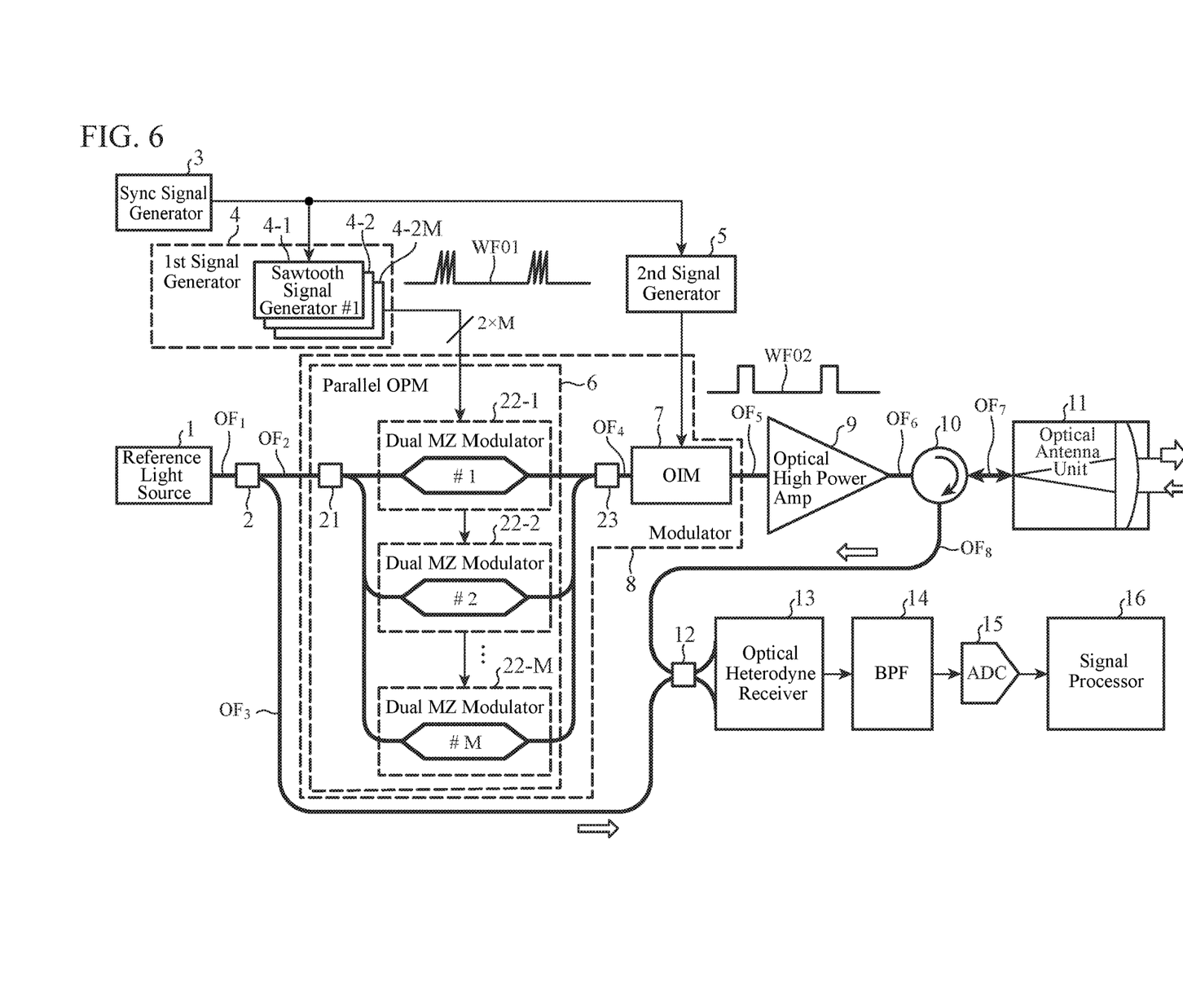
FIG. 6 is a configuration diagram illustrating a laser radar device according to Embodiment 2 of the present disclosure.

In Embodiment 1, an example has been described in which the parallel optical phase modulator 6 includes the optical phase modulators 6-1 to 6-N; however, the parallel optical phase modulator 6 may include an optical path branch coupler 21, dual MZ modulators 22-1 to 22-M that are traveling wave type optical modulators, and an optical multiplexing coupler 23.

FIG. 6 is a configuration diagram illustrating a laser radar device according to Embodiment 2 of the present disclosure. In FIG. 6, since the same reference numerals as those in FIG. 1 denote the same or corresponding portions, the description thereof will be omitted.

The optical path branch coupler 21 causes the transmission seed light beam output from the optical path branch coupler 2 to the transmission path $OF_2$ to branch into N, and outputs the transmission seed light beams having branched to the dual MZ modulators 22-1 to 22-M.

The dual MZ modulator 22-*m* (m=1, 2, 3, ..., M), on the basis of the sawtooth signal output from the sawtooth signal generator 4-*n*, introduces an offset frequency to one of the transmission seed light beams having branched, and outputs the transmission seed light beam to which the offset frequency has been introduced to the transmission path $OF_4$.

Here, N=2×M (M is a natural number). For this reason, the dual MZ modulator 22-*m*, on the basis of the sawtooth signal $sw_{(2 \times m-1)}$ output from the sawtooth signal generator 4-(2×m−1), introduces an offset frequency $f_{ofs\_(2 \times m-1)}$ to one of the transmission seed light beams having branched. In addition, the dual MZ modulator 22-*m*, on the basis of the sawtooth signal $sw_{(2 \times m)}$ output from the sawtooth signal generator 4-(2×m), introduces an offset frequency $f_{ofs\_(2 \times m)}$ to one of the transmission seed light beams having branched.

The optical multiplexing coupler 23 multiplexes the transmission seed light beams to which the offset frequencies have been introduced output from the dual MZ modulators 22-1 to 22-M.

The operation itself of the parallel optical phase modulator 6 is similar to that of Embodiment 1. For this reason, also in Embodiment 2, the influence of the stimulated Brillouin scattering can be avoided, and the SNR can be increased.

In Embodiment 2, because the dual MZ modulators 22-1 to 22-M are used that are widely used in the field of optical communications, effects can be obtained of cost reduction due to mass production of the parallel optical phase modulator 6, improvement of availability, and improvement of reliability.

In the laser radar device of FIG. 6, the optical path branch coupler 2, the parallel optical phase modulator 6, the optical path multiplexing coupler 12, the optical heterodyne receiver 13, and the transmission paths $OF_2$, $OF_3$, $OF_4$, and $OF_8$ may be mounted on the same substrate. Note that, not only the parallel optical phase modulator 6 that is a part of the modulator 8, but also all of the modulator 8 including the optical intensity modulator 7 may be mounted on the substrate.

As the substrate on which these components are mounted, a substrate using silicon, indium phosphide, organic polymer, or the like is conceivable.

The components are mounted on the same substrate, whereby in addition to the cost reduction and high reliability due to the reduction of the number of parts, an effect can be obtained of downsizing by integrated mounting.

Embodiment 3

Figure 7:
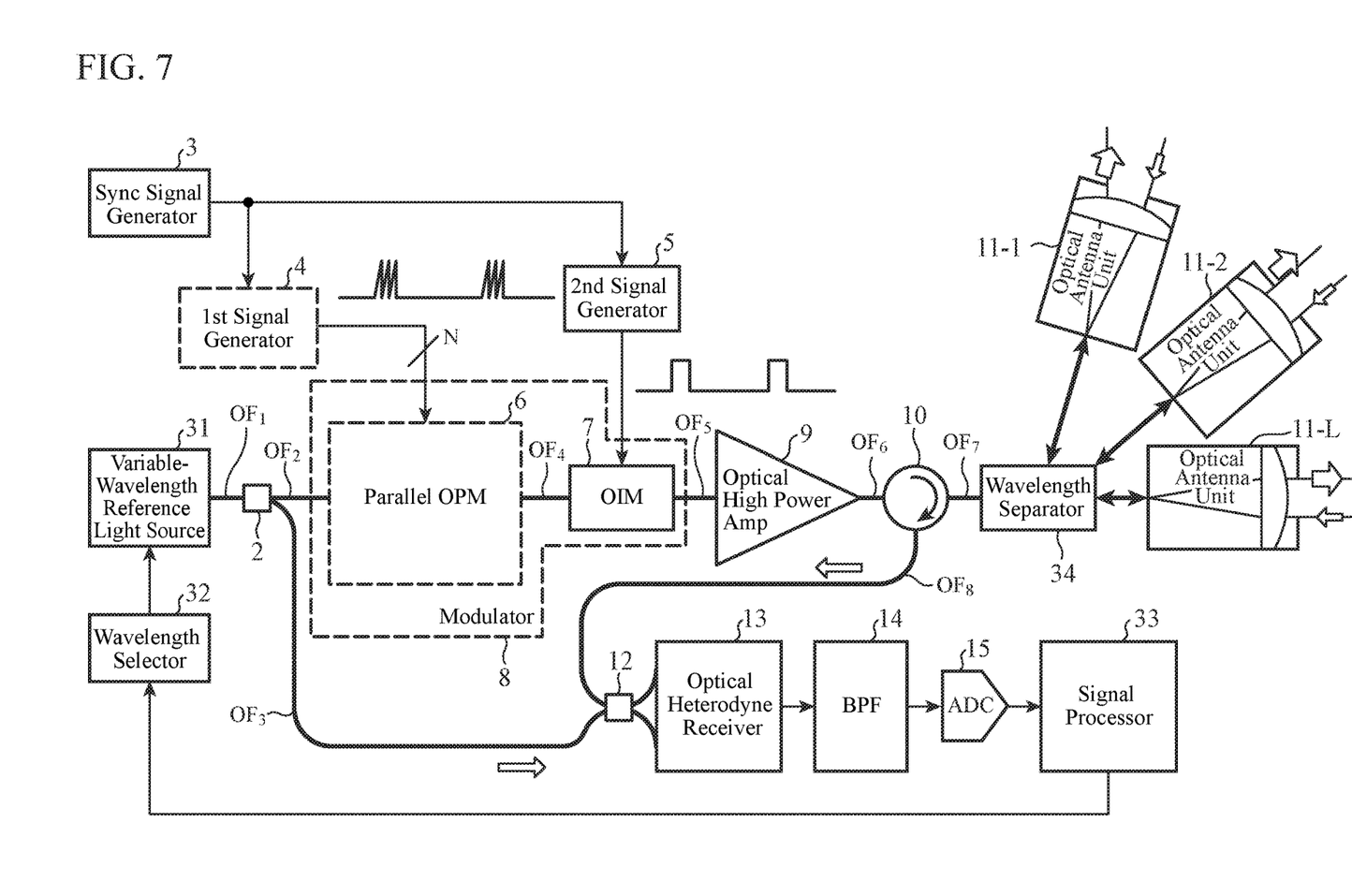
FIG. 7 is a configuration diagram illustrating a laser radar device according to Embodiment 3 of the present disclosure.

In the above-described Embodiments 1 and 2, examples have been described in which the laser radar device includes one optical antenna unit 11; however, the laser radar device may include a plurality of optical antenna units 11.

FIG. 7 is a configuration diagram illustrating a laser radar device according to Embodiment 3 of the present disclosure. In FIG. 7, because the same reference numerals as those in FIG. 1 denote the same or corresponding portions, the description thereof will be omitted.

A variable wavelength reference light source 31 is a light source for oscillating the transmission seed light beam of a wavelength indicated by a wavelength designation signal output from a wavelength selector 32, out of L wavelengths (L is an integer of greater than or equal to 2).

The L wavelengths are wavelengths within a gain band range of the optical high power amplifier 9 and are wavelengths within a band that can pass through an input/output port of a wavelength separator 34.

The wavelength selector 32 is a selector for selecting the wavelength of the transmission seed light beam oscillated by the variable wavelength reference light source 31 on the basis of a control signal output from a signal processor 33.

Similarly to the signal processor 16 of FIG. 1, the signal processor 33 analyzes the beat signal converted into the digital signal by the ADC 15, and also controls the wavelength selector 32.

The wavelength separator 34 outputs N pulsed light beams to the optical antenna unit 11-1 if the wavelengths of the N pulsed light beams output from the optical circulator 10 are wavelengths corresponding to the optical antenna unit 11-1, and outputs the N pulsed light beams to the optical antenna unit 11-2 if the wavelengths of the N pulsed light beams output from the optical circulator 10 are wavelengths corresponding to the optical antenna unit 11-2.

In addition, the wavelength separator 34 outputs the N pulsed light beams to the optical antenna unit 11-L if the wavelengths of the N pulsed light beams output from the optical circulator 10 are wavelengths corresponding to the optical antenna unit 11-L.

The wavelength separator 34 outputs backscattered light beams output from the optical antenna units 11-1 to 11-L to the optical circulator 10.

As the wavelength separator 34, for example, it is possible to use a wavelength separation coupler or an array waveguide grating (AWG) in which a plurality of input/output ports is assigned at an interval of a wavelength called an ITU grid conforming to ITU-TG.691 recommendation.

Similarly to the optical antenna unit 11 of FIG. 1, the optical antenna units 11-1 to 11-L are units having optical antennas, but are prepared for the number of wavelengths selected by the wavelength selector 32, and directional angles that are the emission directions of the pulsed lights are different from each other.

Next, the operation will be described.

Since Embodiment 3 is similar to Embodiment 1 except for the variable wavelength reference light source 31, the wavelength selector 32, the signal processor 33, the wavelength separator 34, and the optical antenna units 11-1 to 11-L, here, only operations will be described of the variable wavelength reference light source 31, the wavelength selector 32, the signal processor 33, the wavelength separator 34, and the optical antenna units 11-1 to 11-L.

The signal processor 33 outputs the control signal giving an instruction for selecting the wavelength to the wavelength selector 32 at intervals longer than 0.1 to several sec that is an effective measurement rate of the wind measurement LIDAR device.

The wavelength selector 32 selects the wavelength of the transmission seed light beam oscillated by the variable wavelength reference light source 31 on the basis of the control signal output from the signal processor 33.

Specifically, the wavelength selector 32 outputs the wavelength designation signal designating the wavelength of the transmission seed light beam to the variable wavelength reference light source 31 so that the transmission seed light beams of L wavelengths are sequentially oscillated from the variable wavelength reference light source 31.

The variable wavelength reference light source 31 oscillates the transmission seed light beam of the wavelength indicated by the wavelength designation signal output from the wavelength selector 32 out of the L wavelengths, and outputs the transmission seed light beam to the optical path branch coupler 2.

When receiving the N pulsed light beams from the optical circulator 10, the wavelength separator 34 outputs the N pulsed light beams to the optical antenna unit 11-1 if the wavelengths of the N pulsed light beams are wavelengths corresponding to the optical antenna unit 11-1.

The wavelength separator 34 outputs the N pulsed light beams to the optical antenna unit 11-2 if the wavelengths of the N pulsed light beams are wavelengths corresponding to the optical antenna unit 11-2, and outputs the N pulsed light beams to the optical antenna unit 11-L if the wavelengths of the N pulsed light beams are wavelengths corresponding to the optical antenna unit 11-L.

The optical antennas of the optical antenna units 11-1 to 11-L expand the beam diameter of the N pulsed light beams output from the wavelength separator 34 and emit the N pulsed light beams into space in predetermined directions.

The optical antennas of the optical antenna units 11-1 to 11-L emit N pulsed light beams into the space, and then receive backscattered light beams of the pulsed light beams backscattered by scattering objects existing in the space, and output the backscattered light beams to the wavelength separator 34.

The wavelength separator 34 outputs the backscattered light beams output from the optical antenna units 11-1 to 11-L to the optical circulator 10.

Similarly to the signal processor 16 of FIG. 1, the signal processor 33 analyzes the digital signal output from the ADC 15.

As is apparent from the above description, according to Embodiment 3, the laser radar device includes: the variable wavelength reference light source 31 for oscillating the transmission seed light beam of any one wavelength of a plurality of wavelengths; the wavelength selector 32 for selecting the wavelength of the transmission seed light beam oscillated by the variable wavelength reference light source 31; and the wavelength separator 34 for separating wavelengths of the plurality of pulsed light beams amplified by the optical high power amplifier 9, in which the optical antenna units 11-1 to 11-L each radiate the pulsed light beam of any one wavelength separated by the wavelength separator 34 into the space, so that there is an effect that an observation space can be selected without mechanical driving.

In Embodiment 3, an example has been described in which plural optical antennas are installed so that the directional angles of the optical antennas of the optical antenna units 11-1 to 11-L are different from each other; however, this is not a limitation, and for example, the plural antennas may be installed as described in the following (a) to (d).

(a) The plural optical antennas are installed apart while keeping azimuth angles of the optical antennas of the optical antenna units 11-1 to 11-L at the same angle.

(b) The plural optical antennas are installed so that the optical antennas of the optical antenna units 11-1 to 11-L are arranged close to each other, and the azimuth angles are equidistant at a constant elevation angle.

(c) The plural optical antennas are installed so that the optical antennas of the optical antenna units 11-1 to 11-L are arranged close to each other, and the elevation angles are equidistant at a constant azimuth angle.

(d) The plural optical antennas are installed so that the optical antennas of the optical antenna units 11-1 to 11-L are arranged close to each other, and the emission directional angles forms a conical shape.

In a case where the plural optical antennas are installed as in the above (a), it is possible to measure a wind velocity distribution in the line-of-sight direction in a plane of a wide area.

In a case where the plural optical antennas are installed as in the above (b), it is possible to measure a wind velocity distribution in a plan position indicator (PPI) method.

In a case where the plural optical antennas are installed as in the above (c), it is possible to measure a wind velocity distribution in a range height indicator (RHI) method.

In a case where the plural optical antennas are installed as in the above (d), it is possible to measure a three-dimensional wind velocity vector, a wind direction, a wind velocity, and a vertical wind by a velocity azimuth display (VAD) method.

In Embodiment 3, an example has been described in which the laser radar device includes the variable wavelength reference light source 31; however, as the variable wavelength reference light source 31, it is possible to use a digital coherent optical communication integrated variable wavelength laser (Integrable Tunable Laser Assembly (ITLA)) or the like.

In addition, a two-output integrated variable wavelength laser (two-output ITLA) may be used having a function of the variable wavelength reference light source 31 and a function of the optical path branch coupler 2. As a result, the number of parts is reduced, so that cost reduction and high reliability can be achieved.

In the laser radar device of FIG. 7, the optical path branch coupler 2, the parallel optical phase modulator 6, the optical path multiplexing coupler 12, the optical heterodyne receiver 13, and the transmission paths $OF_2$, $OF_3$, $OF_4$, and $OF_8$ may be mounted on the same substrate. Note that, not only the parallel optical phase modulator 6 that is a part of the modulator 8, but also all of the modulator 8 including the optical intensity modulator 7 may be mounted on the substrate.

As the substrate on which these components are mounted, a substrate using silicon, indium phosphide, organic polymer, or the like is conceivable.

The components are mounted on the same substrate, whereby in addition to the cost reduction and high reliability due to the reduction of the number of parts, an effect can be obtained of downsizing by integrated mounting.

Note that, within the scope of the invention, free combinations of Embodiments, modifications to any components of each Embodiment, or omissions of any components in each Embodiment is possible.

INDUSTRIAL APPLICABILITY

Embodiments of the present disclosure are suitable for a laser radar device for emitting a pulsed light beam into space and receiving a backscattered light beam of the emitted pulsed light beam.

REFERENCE SIGNS LIST

1: Reference light source, 2: Optical path branch coupler, 3: Synchronization signal generator, 4: First signal generator, 4-1 to 4-N: Sawtooth signal generator, 5: Second signal generator, 6: Parallel optical phase modulator, 6-1 to 6-N: Optical phase modulator, 7: Optical intensity modulator, 8: Modulator, 9: Optical high power amplifier (optical amplifier), 10: Optical circulator, 11, 11-1 to 11-L: Optical antenna unit, 12: Optical path multiplexing coupler, 13: Optical heterodyne receiver (receiver), 14: Band pass filter (filter), 15: ADC (converter), 16: Signal processor, 21: Optical path branch coupler, 22-1 to 22-M: Dual MZ modulator (traveling wave type optical modulator), 23: Optical multiplexing coupler, 31: Variable wavelength reference light source, 32: Wavelength selector, 33: Signal processor, 34: Wavelength separator.

The invention claimed is:

1. A laser radar device comprising:
   a variable wavelength reference light source for oscillating a transmission seed light beam of any one wavelength of a plurality of wavelengths;
   a wavelength selector for selecting a wavelength of the transmission seed light beam to be oscillated by the variable wavelength reference light source;
   a modulator for causing the transmission seed light beam to branch, introducing differing offset frequencies to a plurality of branched transmission seed light beams, modulating each of the plurality of transmission seed light beams into a pulsed light beam, and outputting a plurality of pulsed light beams, or for modulating the transmission seed light beam into a pulsed light beam, causing the pulsed light beam to branch, introducing differing offset frequencies to a plurality of branched pulsed light beams, and outputting the plurality of pulsed light beams;
   an optical amplifier for amplifying the plurality of pulsed light beams output from the modulator;
   a wavelength separator for separating wavelengths of the plurality of pulsed light beams amplified by the optical amplifier,
   an optical antenna for emitting the plurality of pulsed light beams amplified by the optical amplifier into space, and receiving backscattered light beams of the plurality of emitted pulsed light beams;
   a receiver for detecting respective beat signals from the plurality of backscattered light beams received by the optical antenna;
   a filter in which frequency bands each including a frequency of signal components included in the plurality of beat signals detected by the receiver are set as pass bands and frequency bands not including any of the frequencies of the signal components are set as cutoff bands; and
   a converter for sampling the beat signals passing through the filter at a sampling frequency, wherein
   the optical antenna is provided for the number of wavelengths to be selected by the wavelength selector, and each optical antenna emits a pulsed light beam of any one wavelength separated by the wavelength separator into space.

2. The laser radar device according to claim 1, wherein the modulator introduces the offset frequencies such that a frequency interval of the plurality of pulsed light beams output to the optical amplifier is larger than a gain bandwidth of stimulated Brillouin scattering to be generated in the optical amplifier or a transmission path from the optical amplifier to the optical antenna.

3. The laser radar device according to claim 1, wherein the modulator includes a plurality of optical phase modulators for introducing the offset frequencies to the branched transmission seed light beams or the branched pulsed light beams, and
   the plurality of optical phase modulators introduces offset frequencies different from each other.

4. The laser radar device according to claim 1, wherein the modulator includes a plurality of traveling waveform type optical modulators for introducing the offset frequencies to the branched transmission seed light beams or the branched pulsed light beams, and
   the plurality of traveling wave type optical modulators introduces offset frequencies different from each other.

5. The laser radar device according to claim 1, further comprising
   a reference light source for oscillating the transmission seed light beam of a single frequency, wherein
   the transmission seed light beam oscillated by the reference light source is output to the modulator.

6. The laser radar device according to claim 1, further comprising a signal processor for analyzing the beat signals sampled by the converter.

7. The laser radar device according to claim 1, wherein a part or all of the modulator and the receiver are mounted on a common substrate.

* * * * *